UNITED STATES PATENT OFFICE.

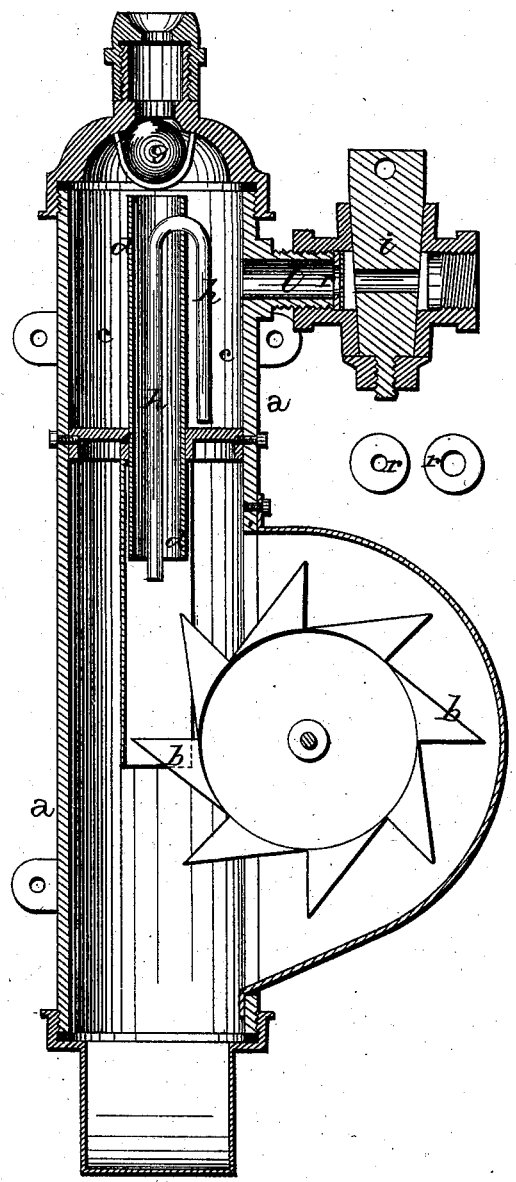

MARSHAL WHEELER, OF WATERTOWN, NEW YORK, ASSIGNOR OF ONE-THIRD HIS RIGHT TO THOS. C. CHITTENDEN AND JOHN C. ARMSTRONG, OF SAME PLACE.

IMPROVEMENT IN ROTARY WATER-METERS.

Specification forming part of Letters Patent No. 203,685, dated May 14, 1878; application filed October 18, 1877.

*To all whom it may concern:*

Be it known that I, MARSHAL WHEELER, of Watertown, in the county of Jefferson and State of New York, have invented certain new and useful Improvements in Water-Meters; and I do hereby declare the following to be a full, clear, and exact description of the invention, such as will enable others skilled in the art to which it pertains to make and use it, reference being had to the accompanying drawings, which form part of this specification.

My invention relates to an improvement in water-meters; and it consists in forming a chamber in the upper part of the meter to receive the drip or water that is passing through the meter in a very small quantity, and which is provided with a siphon, so as to empty all the water in the chamber as soon as the water has reached a certain height, as will be more fully described hereinafter.

The accompanying drawings represent my invention.

$a$ represents a cylindrical elongated frame, which has an enlargement upon one side toward the lower end to receive the registering and measuring wheel $b$. In the upper part of this case is formed a chamber, $c$, down through the center of which passes the discharge-pipe $d$, the upper end being made to extend up near the top of the chamber, and the lower end being made to project downward just above the buckets of the wheel, so that any water that passes through it will be sure to flow into the buckets. In the upper part of this chamber is placed a ball-valve, $g$, of any suitable material, which allows the air to flow freely down into the chamber from above; but should the water in the chamber rise so as to more than fill the chamber this ball will instantly close and prevent it from escaping upward. Inside of the chamber is placed the short leg of the siphon $h$, the longer leg of which is made to pass down through the central pipe, so as to also discharge into one of the buckets of the wheel. It will be seen that the top of this siphon reaches nearly to the top of the discharge-pipe $d$, while the lower end of the short leg reaches down to or almost to the bottom of the chamber.

When the cock $i$ in the pipe $l$ is open the chamber is filled with water, which passes in through said cock. Should, however, the cock be left only slightly open, so that the water leaks into the meter, it will be collected in this chamber $c$ until it rises above the top of the siphon, when the siphon will immediately empty all the water there is in the chamber. By means of this arrangement all the water that would otherwise leak through the meter without being registered is caught and made to register in the same manner as the water that is passing through in a volume.

Between the cock and the meter is placed the perforated disk $r$, to regulate or equalize the unequal pressure in high and low parts of the town. The apertures through the disks are made of different sizes, a small hole for a high pressure and a large hole for a low pressure. This disk insures the passage or flow of the water through the meter at a uniform rate, thus attaining accuracy of measurement.

Having thus described my invention, I claim—

1. In a meter, the combination of a chamber, $c$, pipe $d$, siphon $h$, and registering mechanism, substantially as shown.

2. In a meter, the combination of the chamber $c$, inlet $l$, valve $g$, to prevent upward escape of the water, pipe $d$, reaching to top of the chamber, and siphon to empty the chamber, substantially as described.

3. In a water-meter, the disk $r$, placed in the inlet-pipe $l$ as a means of regulating the pressure of the water in high and low parts of the town, substantially as set forth.

In testimony that I claim the foregoing I have hereunto set my hand this 24th day of September, 1877.

MARSHAL WHEELER.

Witnesses:
W. A. NIMS,
CHAS. W. HUBBARD.